United States Patent [19]
Gill et al.

[11] Patent Number: 4,806,040
[45] Date of Patent: Feb. 21, 1989

[54] CERAMIC BALL AND SOCKET JOINT

[75] Inventors: Daniel E. Gill, Columbus, Ind.; Shigeo Suzuki; Yasuo Sakata, both of Kanagawa, Japan

[73] Assignee: Cummins Engine Company, Inc., Columbus, Ind.

[21] Appl. No.: 13,902

[22] Filed: Feb. 12, 1987

[51] Int. Cl.[4] ............................ F16D 1/00; F01L 1/14
[52] U.S. Cl. ........................................ 403/24; 403/124; 403/404; 123/90.61
[58] Field of Search ................ 403/124, 126, 404, 24; 123/90.61; 29/156.7 B

[56] References Cited

U.S. PATENT DOCUMENTS

| | | |
|---|---|---|
| 2,561,800 | 2/1971 | Hassan . |
| 2,818,843 | 1/1958 | Frank . |
| 2,861,827 | 11/1958 | Langen et al. . |
| 2,912,267 | 11/1959 | Latzen . |
| 3,034,488 | 5/1962 | Reiners .................. 123/90.61 X |
| 3,091,486 | 5/1963 | Baker . |
| 3,272,190 | 9/1966 | Matteo, Sr. et al. ............. 123/90.61 |
| 3,290,073 | 12/1966 | Gottschald . |
| 3,362,735 | 1/1968 | Maxeiner . |
| 3,711,171 | 1/1973 | Orkin et al. . |
| 4,003,667 | 1/1977 | Gaines et al. . |
| 4,070,122 | 1/1978 | Wisner . |
| 4,225,260 | 9/1980 | Gaines . |
| 4,353,660 | 10/1982 | Parks . |
| 4,508,067 | 4/1985 | Fuhrmann . |

FOREIGN PATENT DOCUMENTS

| | | | |
|---|---|---|---|
| 147384 | 4/1981 | Fed. Rep. of Germany ... | 123/90.61 |
| 146211 | 11/1980 | Japan .............................. | 29/156.7 B |
| 13204 | 1/1982 | Japan .............................. | 123/90.61 |

OTHER PUBLICATIONS

*Form Talysurf*, "Surface Texture-Form-Dimension Measured with one Precise Instrument", Rank Taylor Hobson Limited.

Primary Examiner—Andrew V. Kundrat
Attorney, Agent, or Firm—Sixbey, Friedman, Leedom & Friedman

[57] ABSTRACT

A ball and socket joint which allows the precise positioning of the line of contact between the ball and the socket utilizing a spherically curved socket and an offset radius ball. The significant manufacturing difficulties associated with the shaping of an offset radius socket is avoided by the use of the spherical socket and offset radius ball. Furthermore, the ball and socket configuration enables use of ceramic materials to produce the socket and/or ball components which, in turn, results in a dramatic increase of the life of the ball and socket joint.

10 Claims, 3 Drawing Sheets

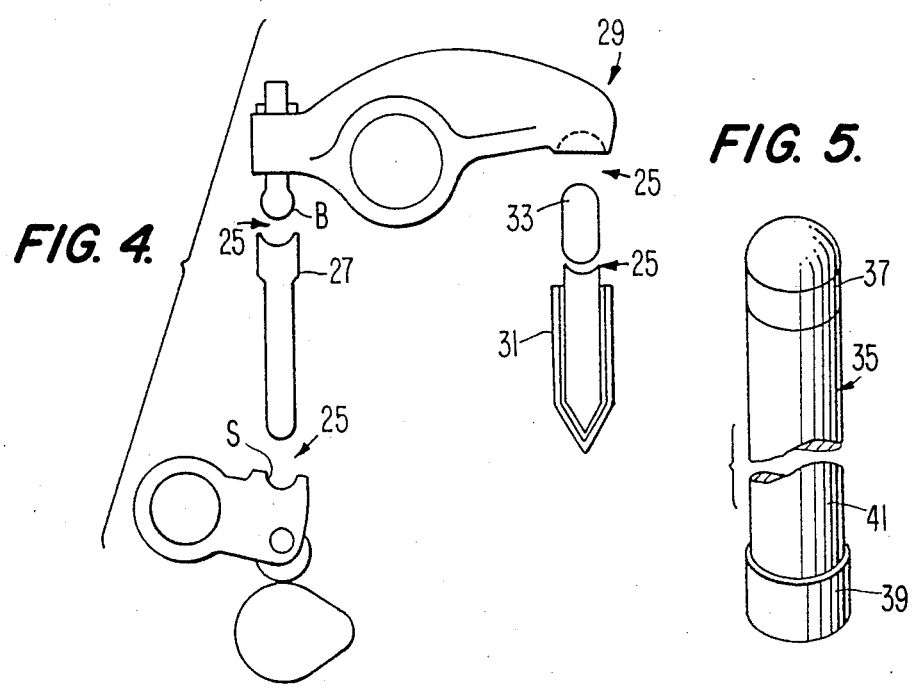
FIG. 4.
FIG. 5.
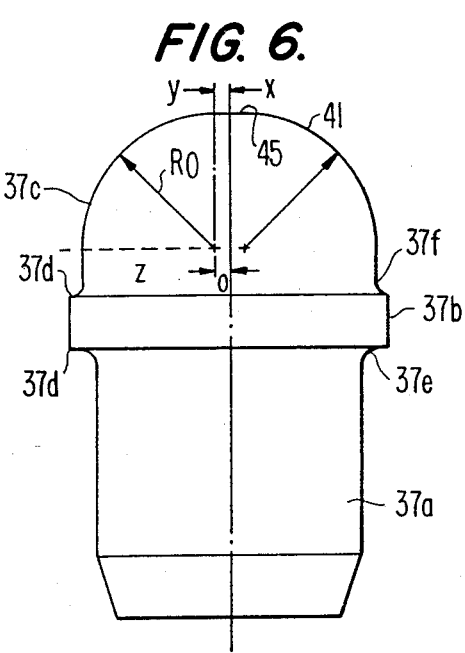
FIG. 6.
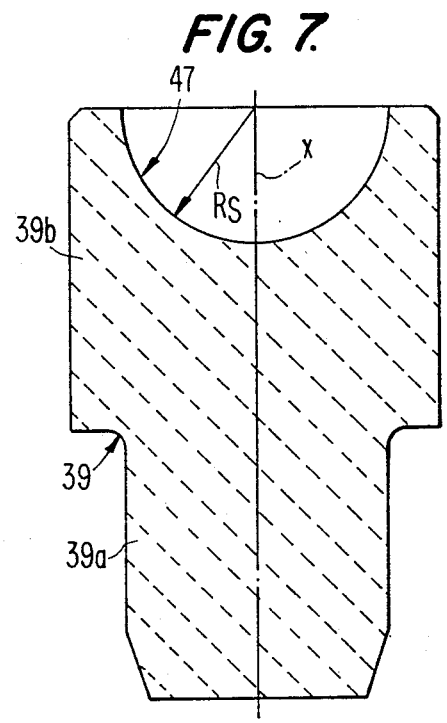
FIG. 7.

CERAMIC BALL AND SOCKET JOINT

TECHNICAL FIELD

The present invention relates to ball and socket joints, particularly those of the type found included in fuel injector valve trains and engine cylinder valve trains of engines.

BACKGROUND OF ART

In the manufacture of ball-socket joints for such applications as the push rods of fuel injector drive train components and cylinder valve drive train components it has, for a long time, been standard practice to ensure that contact between the two socket parts is along a line at a desired location and not at some undesired point. To achieve a precise positioning of the line of contact between the ball and the socket of a ball-socket joint, precise tolerances in the mating surfaces are required and the precise positioning of the line for contact has been achieved by making the socket of a non-spherical shape (i.e., a so-called "gothic arch" or offset radius socket that is machined with a spherical radius that is offset from the radial centerline), while making the ball end part of the joint spherical. An example of such a conventional offset socket ball and socket joint is illustrated in FIG. 1. However, production of such a gothic arch, offset radius, socket requires a machining operation that is twice as difficult as for formation of a spherical socket.

Furthermore, the high compressive loads imposed between the ball and the socket components of such engine sub-system drive trains can result (within as little as 20 to 30 thousand miles) in the metallic surfaces of the ball and/or the socket becoming worn to such an extent that undesirably large amounts of play occur which adversely impact upon the operation of the associated fuel injectors, valves, etc. Thus, when such wear occurs, it is necessary to perform major servicing of the engine and the vehicle equipped with the associated engine must be taken out of use for a day or more.

DISCLOSURE OF THE INVENTION

In view of the foregoing, it is an object of the present invention to provide a ball and socket joint that can be produced in a simpler, and thus less costly, manner than the conventional offset radius socket type ball and socket joints.

It is a further object of the present invention to achieve the elimination of the use of an offset radius socket, while retaining the precision line of contact attributes thereof, through the use of a spherical socket, ball and socket joint.

Still another object of the present invention is to avoid the wear problems associated with ball and socket joints formed of metal ball and sockets components.

It is a specific object of the present invention to increase the wear-free life of a ball and socket joint by making the ball and/or the socket of a ceramic material.

Yet another object of the present invention is to facilitate the manufacture of a ceramic ball and socket joint by utilizing a spherical socket in conjunction with an offset radius ball.

These and other objects in accordance with the present invention are achieved, in accordance with a preferred embodiment of the present invention which utilizes a ball and/or socket component that is formed of a ceramic material such as silicon nitride, silicon carbide, zirconia, etc. and by utilizing a novel ball and socket configuration wherein the socket part is spherical and the ball part has an offset radius which will eliminate contact between the ball and socket near the edge of the ball surface and near the apex of the ball surface.

The use of ceramic components has been found to produce a dramatic wear reduction to such an extent that, even with a metal socket-ceramic ball combination, a life of as much as 500,000 miles can be expected before unacceptably large wear will have resulted (i.e., an increase of as much as 2.5 times the life of prior art metal-to-metal ball and socket joints). Furthermore, since the manufacture of an offset radius socket in a ceramic material presents significant manufacturing difficulties even beyond those present in producing an offset radius socket in a metal component (which, as already noted, is twice as difficult to produce as a spherical socket in a metal component), the offset radius ball construction of the preferred embodiment enables a ceramic ball and socket joint to be economically manufactured. Moreover, the advantages achieved through the use of a spherical socket with an offset radius ball are applicable not only when both components are formed of ceramic, but also when only one component is formed of a ceramic, but e.g., where only the ball is formed of ceramic, and when all metal components are used, since a great deal of manufacturing difficulty is still eliminated; although it is noted that a pure ceramic joint would be capable of handling significantly higher compressive loads than would an all metal, or a single ceramic component ball and socket joint.

These and other characteristics, features and benefits of the present invention will become more apparent from the following detailed description and accompanying drawings.

BRIEF DESCRIPTION OF THE DRAWINGS

FIG. 4 is a diagrammatic illustration of the fuel injector drive train incorporating a plurality of ball and socket joints of the type to which the present invention is directed;

FIG. 5 is a perspective view of a drive train component incorporating a ceramic ball and a ceramic socket in accordance with the present invention;

FIG. 6 is a cross-sectional view of the ball end part of the FIG. 5 drive train component;

FIG. 7 is a cross-sectional view of a socket end part of the FIG. 5 drive train component;

BEST MODE FOR CARRYING OUT THE INVENTION

Figure 1:
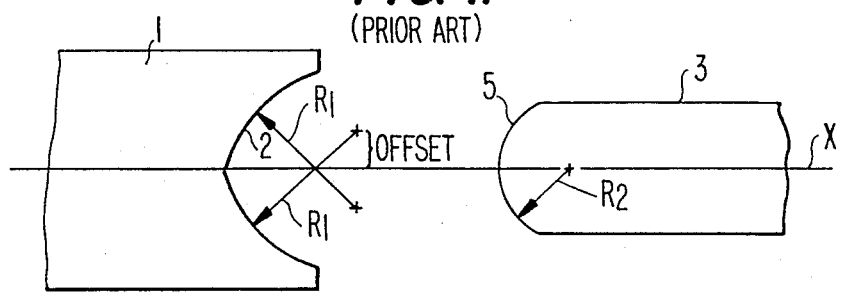
FIG. 1 schematically illustrates in cross-section a conventional offset radius (gothic arch) ball and socket joint configuration in exploded view.

As noted initially, it has been conventional to form a ball and socket join whereby a line of contact between the ball and socket is controlled to occur at a desired location through the use of an offset radius socket and spherical ball type ball and socket joint of the type illustrated in FIG. 1. In such an arrangement, the socket takes on a so-called "gothic arch" shape in cross-section. The arch-shaped socket is formed in the end of a rod 1 by rotation of the rod relative to a machining tool about an axis of symmetry X so that a curvature is produced having a radius $R_1$ that is offset from axis X to the extent represented, by way of example, in FIG. 1. On the other hand, the ball element is constituted by a rod 3 having a spherical ball end 5 whose curvature has a radius $R_2$ that is symmetrical with respect to the center line axis of symmetry X. When the spherical ball end 5 of the rod 3 is brought into engagement with the offset radius socket 2 of the rod 1, a circular line of contact results at an intermediate location between the apex of the arch and the outer edge thereof. As also noted, production of such an offset radius socket is twice as difficult to produce in a metal component as is a spherical one, but due to the hardness of ceramic materials, such as silicon nitride, silicon carbide, zirconia, etc., the manufacturing difficulties associated with the production of such a socket become so significant as to make it economically impractical to produce.

Figure 2:
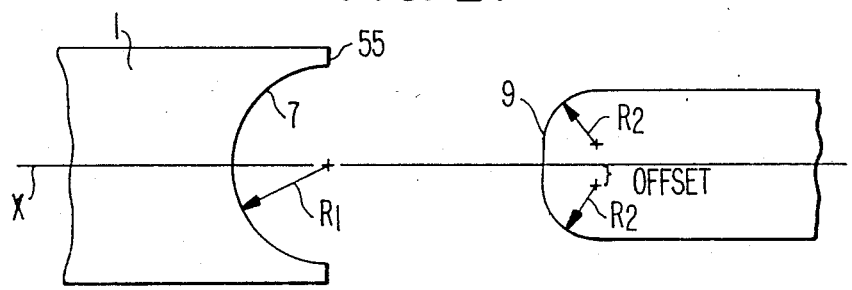
FIG. 2 is a view similar to that of FIG. 1, but illustrating a ball and socket joint configuration in accordance with the present invention.

On the other hand, as schematically depicted in FIG. 2, the socket rod 1 is provided with a spherical socket 7 having a curvature with a radius $R_1$ that is symmetrical with respect to the center line axis of symmetry X, while the ball end of the rod 3 is an offset radius ball 9 with a rounded edge curvature that is produced by rotation of the rod relative to the machining tool in a manner producing a rounded corner curvature having a radius $R_2$ that is offset with respect to the center line axis of symmetry by an amount as represented, for example, in FIG. 2. This new configuration for a ball and socket joint in accordance with the present invention is half as difficult to produce as an offset socket type ball and socket joint and, for the first time, makes it economically feasible to use ball and/or socket components formed of ceramic materials such as silicon nitride, silicon carbide, zirconia, etc. Of course, prior to the present invention, it had not been considered to utilize ceramic ball and socket joints.

Figure 3:
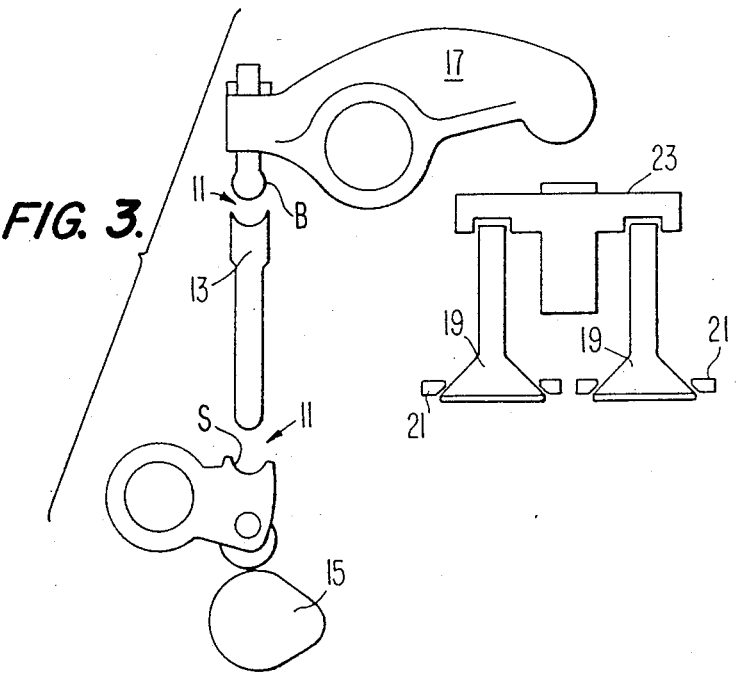
FIG. 3 is a diagrammatic illustration of a cylinder head valve drive train incorporating a plurality of ball and socket joints of the type to which the present invention is directed.

However, it has been found that in a drive train of the type schematically indicated in either FIG. 3 or FIG. 4, by way of example, ceramic ball and socket joints can increase the compressive loads to which such joints may be subjected and, even when only one of the ball and socket parts is formed of a ceramic material, the life of the joint achievable before an unacceptably large amount of wear occurs can be increased by over an order of magnitude to, for example, 500,000 miles. In this regard, it is noted that FIG. 3 depicts an engine cylinder head valve drive train wherein ball and socket joints 11 are provided at each of opposite ends of a push rod 13 used to transmit movement produced by a cam 15 to a valve rocker lever 17, the lever 17 being used to seat and unseat valves 19 with respect to the valve seat inserts 21 via the cross head 23.

FIG. 4, on the other hand, depicts a fuel injector drive drain having four ball and socket joints 25. A first pair of joints 25 are disposed at opposite ends of a push rod 27 similar to the arrangement of FIG. 3, while motion is transmitted from the injector rocker lever 29 to the injector piston 31 through the intermediary of a modified push rod 33 which also forms a pair of ball and socket joints 25 at each of opposite ends thereof.

It is noted that while the present invention finds particular utility in drive trains of the type shown in FIGS. 3 and 4 (wherein high loads are experienced, servicing of the ball and socket joints is costly and time consuming, and the required frequency of servicing can be an important factor in the purchase of an engine for a vehicle or piece of equipment of which it is a part), the inventive ball and socket joint will also find utility in numerous other environments which require ball and socket joints of the type wherein a precisely located line of contact can be maintained between the ball and the socket of the joint.

With reference to FIGS. 5–7, a preferred embodiment push rod 35 (which may be either the push rod 13 of the FIG. 3 drive train or the push rod 27 of the FIG. 4 drive train, for example) is shown. Push rod 35 utilizes a ceramic ball end part 37 and a ceramic socket end part 39 in accordance with the present invention. It should also be appreciated that the ball parts B and socket parts S (FIGS. 3, 4) that cooperate with the ball parts 37 and socket parts 39 may also be ceramic or may be formed of metal. Likewise, the modified push rod 33 can be formed in the same manner as push rod 35 simply by substituting a second ball end part 37 for the socket end part 39.

The push rod 35 is formed of a rod part 41 that may either by a hollow tube or a solid rod the ends of which have been provided with cylindrical recesses. Thus, the ball end and socket end parts 37, 39 are formed with plug ends 37a, 39a, as shown in FIGS. 6 and 7, by way of which these parts may be secured to the ends of rod 41 in a manner forms no part of the present invention.

In addition to the plug end portion 37a, the ball end part 37 has an abutment rib portion 37b and a ball portion 37c, break edges 37d of the abutment portion 37b merging into the plug portion 37a and the ball portion 37c by way of radius curved surfaces 37e and 37f. In accordance with the present invention, the ball portion 37c is a radial offset ball having a spherical radius offset surface 41 that is defined by the locus of points swept by the offset radius $R_o$ (which is radially offset by a distance o from the axis of symmetry X) as it is rotated about the axis of symmetry and swept between the axial line Y and the base line Z. Below base line Z, the peripheral portion 43 may simply be a cylindrical shape having a radius corresponding to that of the curved surface 41 at the base line Z (i.e., is equal to the radius $R_o$ plus the radial offset o). Within the circular area 45 at the top of the ball portion 37c (defined by the locus of points swept by the radius $R_o$ when it is parallel to the line Y and rotated about the axis of symmetry X) the surface 45 can be left flat and parallel to the base line Z. The manner in which selection of the radius $R_o$ and the radial offset o are selected is described in greater detail below.

The socket end part 39 has a socket portion 39b within which a hemispherically curved socket surface 47 is formed having a radius $R_s$. However, surface 47 may be a spherical surface of less than hemispherical extent in some cases.

Figure 8:
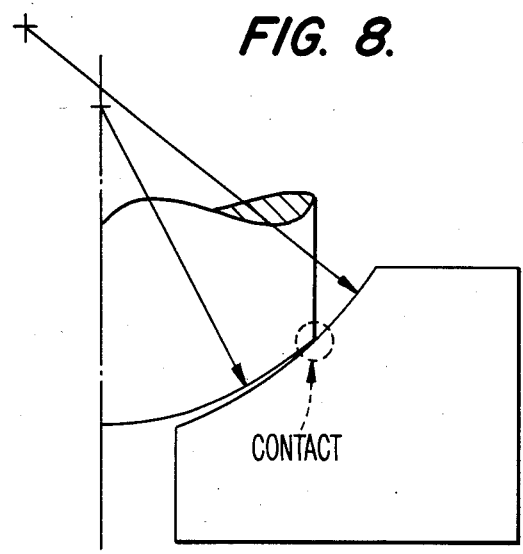
FIGS. 8 and 9 represent geometric ball and socket configurations to be avoided in accordance with the present invention and serve as a guide to the selection of offset radii usable in accordance with the present invention.
Figure 9:
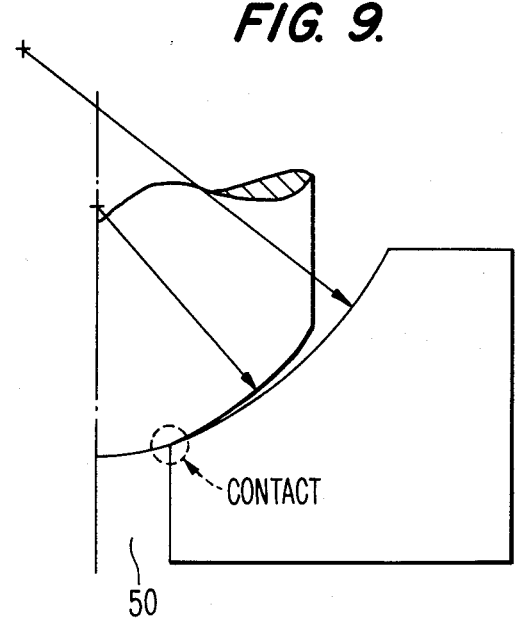

When a part having a socket 7, 47 is brought into engagement with a part having an offset radius ball 9, 37c, with their parts axially aligned (disposed on a common axis of symmetry), a circular locus of points of contact will occur. If this locus of contact points occurs at the edge of the ball surface (FIG. 8), the contact will produce undesirably high levels of stress at the point of contact. Likewise, if points of contact occur at the perimeter of area 45 or at the edge of a socket drilling 50 (of the type commonly provided for supplying lubrication to the joint), undesirably high stress levels will occur at the line of contact as well. The same holds true if contact between the ball and socket occurs at the apex of the ball if, instead of utilizing a flat-topped offset radius ball, a gothic arched ball is utilized.

Thus, in addition to the usual considerations in the design of a ball and socket joint for a drive linkage, the radii and offset should be selected so as to form a line of contact that will be as far as practical from contact points which would produce high stress levels. For example, usually it would be desirable to produce a line of contact at a location approximately at the mid point of the 90 degree angle defined between the axial line Y and the base line Z) but in joints wherein the socket has an undercut, this line of contact might have to be shifted to avoid any such undercut. With this in mind, it has been found that an offset o from the center line axis of symmetry X will usually be most advantageously selected in the range of 4 to 7 percent of the length of the radius $R_o$. Furthermore, apart from the fact that the radius $R_1$ will be larger than the radius $R_2$ to ensure that the ball end will fit within the spherical socket, no specific relationship between these two radii need be maintained apart from the noted constraint of selecting these radii so as to achieve a line of contact between the ball and socket surfaces which will not result in the described high stress concentrations occurring.

Apart from the inventive characteristics of the described ball and socket joint, it should be recognized that the radii and extent of the socket surface will be dictated by the usual considerations attendant to avoiding any obstruction to achieving the degree of pivoting motion required to be produced during operation of the drive train, as might occur if, for example, the radii and extent of the socket surface were such that the push rod 13, 27, 33 abuts the the break edge 55 (FIG. 2) of the socket under operating conditions that can be anticipated. Also, by way of example, for push rod 35 of a fuel injector drive train, a socket end part 39 having a spherical radius of 6.34+0.05 inches has been found suitable for use with a radial offset ball having a radial offset of 0.510+0.025 inches and an offset radius of 7.10+0.05 inches.

A ball and socket joint produced in accordance with the foregoing has been found to be producable with a significant reduction in the manufacturing difficulties associated with the production of a gothic arch (offset radius) socket, ball and socket joint, irrespective of whether metals or ceramics are utilized, while still allowing the same precise positioning of the line of contact between the ball and the socket to be achieved as with a conventional gothic arch socket type ball and socket joint. Moreover, when ceramics are utilized to form the ball and/or socket parts, as now becomes feasible through the present invention, a dramatic increase in the life of the joint is attained.

INDUSTRIAL APPLICABILITY

The present invention finds particular utility in cylinder head valve and fuel injector drive train components for engines, such as diesel engines, but also will find utility in any environment where it is necessary or desirable to utilize a ball and socket joint wherein the line of contact between the ball and the socket is precisely positioned, since the benefits attributable to use of the ball and socket joint configuration of the present invention is material independent. Furthermore, the use of a ceramic ball and socket joint in accordance with the present invention will find particular applicability in any environment wherein the joint will be subjected to high compressive stresses and the value of a dramatically increased wear-free life outweighs the cost associated with using ceramic materials that are more expensive than conventionally utilized metals.

We claim:

1. A ball and socket joint comprising a socket part formed of a ceramic material and having a socket therein, and a ball part formed of a ceramic material; wherein said socket is defined by a spherically curved surface having a radius of curvature originating at a center line axis of symmetry of the socket, and the ball part has an offset ball surface with a radius of curvature that is offset from the center line axis of symmetry of the ball part; wherein said ball part is provided with a plug-in end portion for attachment thereof within a recess in an end of a rod; wherein said offset ball surface is defined by a locus of points swept by the offset radius of curvature as it is rotated about said center line axis of symmetry of the ball part and swung in an angular direction relative to axial and radial lines through said ball part, said offset ball surface terminating a radial plane extending normal to said axis of symmetry and at which it merges with a cylindrically shaped portion of the ball part that has a radius corresponding to the radius of curvature of the offset ball surface plus its offset from the center line axis of symmetry of the ball part.

2. A ball and socket joint according to claim 1, wherein said ceramic material is selected from the group consisting of silicon nitride, silicon carbide, and zirconia.

3. A ball and socket joint according to claim 2, wherein said offset is approximately in the range of from 4-7% of the length of the radius of curvature of the ball surface.

4. A ball and socket joint according to claim 1, wherein said offset is approximately in the range of from 4-7% of the length of the radius of curvature of the ball surface.

5. A ball and socket joint according to claim 1, wherein said ball part has an abutment portion that merges into each of said plug-in end portion and said cylindrically shaped portion via a respective radius curved surface.

6. A ball and socket joint according to claim 5, wherein said offset is approximately in the range of from 4-7% of the length of the radius of curvature of the ball surface.

7. A ball and socket joint according to claim 6, wherein said ceramic material is selected from the group consisting of silicon nitride, silicon carbide, and zirconia.

8. A drive train of the type having at least one push rod drivingly connected to another drive train component by a ball and socket joint, wherein said ball and socket joint comprises a socket part formed of a ceramic material and having a socket therein, and a ball part formed of a ceramic material; wherein said socket is defined by a spherically curved surface having a radius of curvature originating at a center line axis of symmetry of the socket, and the ball part has an offset ball surface with a radius of curvature that is offset from the center line axis of symmetry of the ball part; wherein said ball part is provided with a plug-in end portion for attachment thereof within a recess in an end of a rod; wherein said offset ball surface is defined by a locus of points swept by the offset radius of curvature as it is rotated about said center line axis of symmetry of the ball part and swung in an angular direction relative to axial and radial lines through said ball part, said offset ball surface terminating a radial plane extending normal to said axis of symmetry and at which it merges with a cylindrically shaped portion of the ball part that has a radius corresponding to the radius of curvature of the offset ball surface plus its offset from the center line axis of symmetry of the ball part.

9. A drive train according to claim 8, wherein said ball part has an abutment portion that merges into each of said plug-in end portion and said cylindrically shaped portion via a respective radius curved surface.

10. A drive train according to claim 9, wherein said offset is approximately in the range of from 4–7% of the length of the radius of curvature of the ball surface.

* * * * *